April 11, 1967  G. C. ROBERTS, JR., ET AL  3,313,914
MONITORED EVAPORANT SOURCE
Filed Dec. 31, 1964

INVENTORS
GILBERT C. ROBERTS JR.
GIORGIO G. VIA

BY Frederick D. Poz
ATTORNEY

United States Patent Office 3,313,914
Patented Apr. 11, 1967

3,313,914
MONITORED EVAPORANT SOURCE
Gilbert C. Roberts, Jr., Owego, N.Y., and Giorgio G. Via, Rockville, Md., assignors to International Business Machines Corporation, New York, N.Y., a corporation of New York
Filed Dec. 31, 1964, Ser. No. 422,795
6 Claims. (Cl. 219—272)

This invention relates to apparatus for carrying out material deposition processes, and particularly to an improved evaporation rate monitor which is cooperative with an evaporant source for vacuum deposition equipment.

The art of vacuum deposition of films of material has a considerable history in the optical goods industry, and more recently has received much attention in connection with the fabrication of thin film electronic circuits. Deposition rate meters are often incorporated into such vacuum deposition equipment, for control of the quality of the product as well as the final thickness of films therein. One general kind of rate meter employed heretofore for this purpose is the ion gage kind, an example of which is shown and described in the IBM Technical Disclosure Bulletin, vol. 4, No. 9, pp. 13, 14 (February 1962).

Where the deposition chamber contains a plurality of evaporant sources, compactness of design becomes an important element in the equipment, and when two or more sources are to be operated simultaneously and yet monitored individually, it becomes especially important that a rate measuring device be provided which is so arranged as to be sensitive to the evaporant stream from one, while shielded from the stream of another, of the plural sources.

In accordance with the present invention there is provided a multiple evaporant source having facilities for evaporation of, for example, chromium and copper from individual sources separately controllable for deposition of a mixture (in the example, a chromium-copper alloy) of specific portions. For enabling such control, monitor means are provided for measuring the evaporation rate from one of the sources independently of the other, the sensing element of the monitor arrangement being characterized by unusual simplicity and compactness whereby this can be carried out even in a closely nested arrangement of concentric sources. It has been found that the sensing element of such a monitor may comprise a pair of closely spaced electrodes having a temperature difference between them whereby there is a net thermionic electron flow from one to the other. These electrodes may be in the form of a pair of closely spaced, parallel wires placed across the path of flow of evaporant molecules emanating from the source to be monitored. It is found that, with this configuration, the current between the cathode and the anode electrode is greatly increased by, and in accordance with, the evaporant stream flowing past the electrodes. The precise mechanism of this increased conduction is uncertain. For stability, a bias may be applied to the source, but this is not believed to participate directly in the conduction mechanism. Rather, the mechanism appears to be that of a diode having a variable atmosphere which effects its conductivity, whereby that conductivity becomes a measure of the atmosphere. In any event the monitor has the practical advantage of simplicity in that the sensing electrodes can be placed very close to a source, where they are shielded from the effects of other sources in a plural source device, and yet present no substantial obstruction to the issuance of the evaporant stream from the source being monitored.

Accordingly, it is a primary object of the present invention to provide an improved evaporant stream monitor.

It is a further object of the invention to provide a monitor as aforesaid characterized by sensing elements of unusual simplicity and unobtrusiveness whereby they can be located with facility in an evaporator apparatus without impeding the function of other parts.

Still another object of the invention is to provide an improved evaporator device employing a monitor as aforesaid in combination with an evaporant source.

Yet another object of the invention is to provide a monitored evaporant source as aforesaid in combination with another source in an arrangement whereby the monitor is able to sense the evaporant stream from the first source independently of that emanating from the second source, and in a manner which does not interfere with the proper functioning of either source.

The foregoing and other objects, features and advantages of the invention will be apparent from the following more particular description of a preferred embodiment of the invention, as illustrated in the accompanying drawing.

Figure 1:
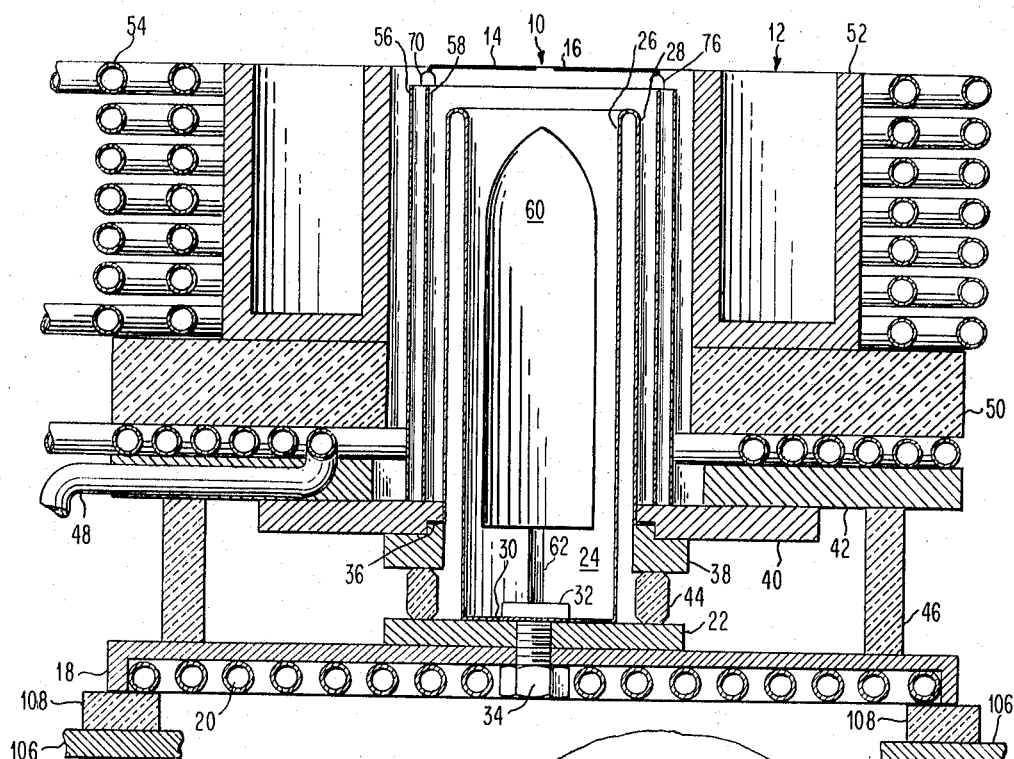
FIG. 1 is a cross sectional view of an evaporant source apparatus embodying monitoring electrodes in accordance with the invention.

Referring more particularly to FIG. 1 of the drawing, a preferred embodiment of apparatus in accordance with the invention may include a multiple source having central and annular evaporant sources 10, 12 together with evaporant stream sensor electrodes 14, 16 in operative juxtaposition to one of the sources 10, as will be more fully described hereinafter.

The apparatus may comprise a base plate 18, which has a water cooling coil 20. In the illustrated apparatus, the plate 18 is of electrically as well as thermally conductive material, and mounts a connector in the form of a disk or washer 22 for making electrical contact to one end of a heater element 24 of the central evaporant source 10. The heater element 24 may be of tantalum and have the general form of a sleeve doubled upon itself with the inner portion 26 being of somewhat smaller cross-section than the outer portion 28. Thus, when current is passed through the heater 24, most of the joule heat is developed in the inner portion 26, with the outer portion 28 serving as a connection leg therefor.

For connecting the heater into a circuit for passage of such current, the inner sleeve 26 has an in-turned end wall 30 which is clamped against the connector 22 by the head of a bolt 32, which fastens these parts to the base 18 by operation of a nut 34. The connection leg 28 of the heater element as an out-turned flange portion 36 at its end which is clamped by ring shaped contact members 38, 40 for completing the electrical circuit connection to the heater 24. As shown, this contact structure 38, 40 may be part of a second layer base structure which supports the outer source 12 and other parts of the apparatus. Thus, the electrode 40 may be attached to an annulus 42, and this composite structure may be supported by annular, electrically insulating refractory rings 44, 46.

Preferably, the annulus 42 is water cooled, as by a coil 48, and, in the illustrated structure, this cooling coil 48 supports another annulus of insulating refractory material 50 which in turn supports the evaporant boat or crucible 52 of the outer source. The evaporant boat 52 may be in the form of an annular trough of sintered molybdenum which is heated by an embracing, water cooled induction coil 54.

A heat shield is provided between the inner wall of the crucible or boat 52 and the heater 24 of the inner source 10. In the illustrated apparatus this heat shield may comprise a pair of coaxial cylinders 56, 58 of conducting refractory material such as tantalum mounted by the electrode plate 40 in thermal contact therewith so as to be cooled by the coil 48.

In use, the inner source 10 operates by sublimation from a charge slug 60 of, for example, compacted chromium powder mounted by a tungsten rod 62 carried by the bolt 32, and it is a feature of the invention that monitor electrodes are provided which are operative to sense the rate of evaporation from this inner source 10 independently of evaporation from the outer source 12.

In the illustrated embodiment, these electrodes 14, 16 are in the form of a pair of filament wires mounted by electrode supports 70, 72, 74, 76 in operative position across the mouth of the central evaporant source 10. The electrode posts 70, 72, 74, 76 may be mounted by attachments (not shown) to the insulator ring 44, with apertures being provided in the rings 38, 40 for enabling passage of these electrodes therethrough in spaced relation therefrom.

Although not shown, it will be understood that, for operation, the induction coil 54 of the outer source 12 is connected to a suitable energizing source, such as a 10 kilocycle generator of adjustable amplitude, and, preferably, suitable plumbing is provided for passage of cooling water through the coil. It has been found in experiments wherein the molybdenum walls of the crucible 52 are rather thick as shown and the charge to be evaporated from that crucible is copper, that most of the power dissipation appears to occur in the crucible walls and there is little change in operation as the copper charge decreases in volume during use. Therefore, it has been found quite practicable to calibrate this source on a power versus evaporation rate basis. Accordingly, in the presently described apparatus only the central source 10 is provided with automatic feed-back controls.

Figure 3:
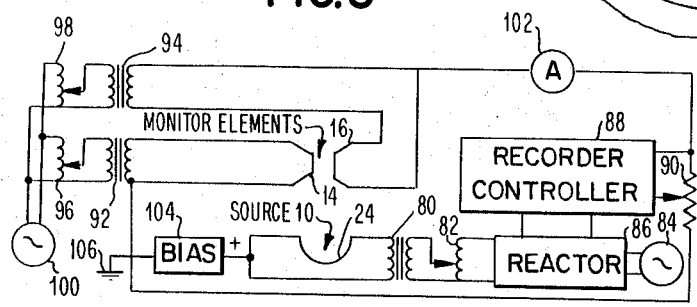
FIG. 3 is an electrical circuit diagram showing schematically an operative relationship of elements of FIG. 1 in use.

These controls are illustrated in FIG. 3 wherein the heater 24 of the source 10 is shown connected through a transformer 80 and an adjustable auto-transformer 82 for energization by the power of a suitable source 84 through a saturable reactor 86. The reactor 86 is under the control of circuitry 88 which is responsive to a signal appearing across a load resistor 90. This signal is generated by operation of the monitor elements 14, 16.

As shown, the monitor elements 14, 16 are connected through isolating transformers 92, 94 for energization in a separately adjustable manner, as by employment of adjustable auto-transformers 96, 98 energized by a source 100. A circuit path exists from one monitor electrode 16, through a microammeter 102 and the load resistor 90 to the other electrode 14. The circuit is energized by the thermionic current between the two electrodes modified by the effect of the evaporant stream emanating from the source 10 and passing the monitor electrodes. Additionally, a bias supply 104 is provided between the source 10 and the machine environment, but it will be seen that this bias is not directly in circuit with the microammeter 102 or the load resistor 90 of the monitor apparatus. This environment is indicated schematically in FIG. 1 by the machine frame portions 106—106, from which the base 18 is insulated, as by a support ring 108.

In a typical example, the heater 24 was constructed of an inner cylinder 26 ⅞" x 4" made of 0.003" tantalum stock, joined at the top to the outer cylinder 28, which was 1⅛" in diameter and made from 0.005" tantalum. The radiation shield structure (represented by 56, 58 herein) was a sheet tantalum cylinder 1⅞" in diameter. The charge 60 was of chromium powder heated and compacted into a rod ⅝" in diameter and 3" long, supported on a 3/32" diameter tungsten rod 62. Power requirements for the heater 24 were 1.1 kva. for 10 A./sec. measured at 25 inches from the source, to 1.5 kva. for 30 A./sec. with a maximum of 5 volts drop across the heater 24.

Figure 2:
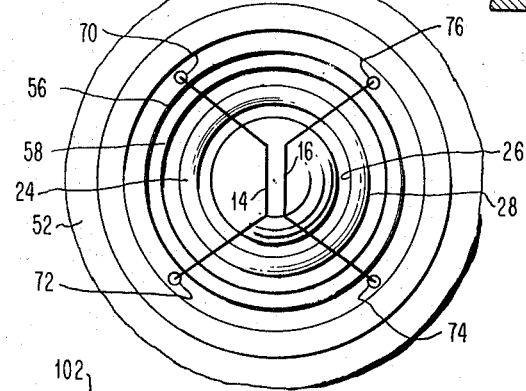
FIG. 2 is a fragmentary top view of the central portion of the apparatus of FIG. 1, showing the relationship of the sensing electrodes to the central evaporant source thereof.

The rate monitor elements 14, 16 consisted of 0.01" diameter tungsten wire filaments of hairpin-like shape, as shown in FIG. 2 of the drawing, wherein their central, parallel portions were 5/16" long and ⅛" apart, and were supported about ¼" above the mouth of the inner source heater 24. The filament voltage applied to these filaments was in the order of 7 volts.

The bias 104 was plus 225 volts applied to the source heater 24 with respect to machine ground 106. The charge 60 and shields 56, 58 are in electrical communication with the heater and thus subject to this bias level, but the filament circuit 14, 16 is not, and, therefore, floats freely with respect to ground.

In operation, the auto-transformers 96, 98 are adjusted for energization of both filaments 14, 16 so that evaporant emanating from the source 10 will not condense thereon. Moreover, the temperature of one of the filaments is made enough higher than that of the other so that there is a net thermionic electron flow from that element to the other. It has been found that under these conditions the evaporant stream from the source 10 operates to increase the net conduction between the electrodes 14, 16 in a manner which is dependent upon the intensity of that evaporant stream. This increase is measurable by the microammeter 102 and can be made operative through the load 90 to activate the control circuitry 88 for adjusting energization of the source heater 24 for maintenance of the evaporation rate at a predetermined level.

For example, in one test apparatus one of the monitor elements was heated until a reading of −10 microamperes of emission was obtained, and then the second element was heated until the reading was reversed to show a net current of +10 micro-amperes measured on the meter of the circuit. Long term drift (over one half hour) was about −1 to +2 microamperes. A typical value of total current during evaporation from the source rose to 85 microamperes when the emission rate was about 10 angstroms per second measured at a distance of 25 inches from the source. The bias 104 does not appear to contribute directly to the operation of the monitor. In fact, when the bias is turned off, the current measured in the monitor circuit increases considerably, but it tends to drift in an undesirable manner; in particular, it becomes sensitive to the heater 24 temperature. The operating vacuum for the system to which these data are applicable was $2 \times 10^{-5}$ to $2 \times 10^{-6}$ Torr. However, the apparatus appears to be insensitive to changes in ambient vacuum at least in this general pressure range.

It will be seen that the multi-source apparatus of the invention is very compact and yet capable of high capacity suitable for production usage, and that this compactness is enabled without the loss of monitored controllability by the provision of the rate measuring apparatus of the invention, characterized as it is by unusual simplicity of the sensing electrode structure 14, 16. It should be noted that, preferably, the source 10 which is monitored by this structure is recessed slightly with respect to the companion source 12 so that a reading of the operation of the former is obtained without regard to the latter. Accordingly, alloys can be evaporated in which the ingredient emanating from the monitored source 10 is individually and accurately measured and controlled.

While the invention has been particularly shown and described with reference to a preferred embodiment thereof, it will be understood by those skilled in the art that various changes in form and details may be made therein without departing from the spirit and scope of the invention.

What is claimed is:

1. An evaporator for use in vacuum deposition apparatus comprising,
an evaporant source comprising a charge of evaporant material and means adapted to energize said charge for causing a stream of vapor flow therefrom,
and a monitor for measuring the intensity of such stream comprising,
a pair of electrodes constituting a diode mounted in said stream,
means for energizing said electrodes to cause a net thermionic emission of electrons from one of said electrodes to the other, said net emission as modified by vapor between the electrodes constituting a current between said electrodes,
and circuit means including current responsive means connecting said electrodes one to the other operative to sense changes in said current between said electrodes.

2. An evaporator for use in vacuum deposition apparatus comprising,
an evaporant source comprising a charge of evaporant material and means adapted to energize said charge for causing a stream of vapor flow therefrom,
and a monitor for measuring the intensity of such stream comprising,
a pair of electrodes mounted in said stream,
thermal means for energizing said electrodes differentially to cause a net thermionic emission of electrons from one of said electrodes to the other,
and circuit means including current responsive means connecting said electrodes one to the other,
and bias means connected to said source for maintaining said source positive with respect to said apparatus.

3. An evaporator for use in vacuum deposition apparatus comprising,
an evaporant source comprising a charge of evaporant material and means adapted to energize said charge for causing a stream of vapor flow therefrom,
and monitor for measuring the intensity of such stream comprising,
a pair of electrodes mounted in said stream,
means for energizing said electrodes to cause a net thermionic emission of electrons from one of said electrodes to the other, said energizing means comprising joule heating means operative to bring said electrodes to different temperatures for effecting said net emission,
and circuit means including current responsive means connecting said electrodes one to the other,
and bias means connected to said source for maintaining said source positive with respect to said apparatus.

4. An evaporator for use in vacuum deposition apparatus comprising,
an evaporant source comprising a charge of evaporant material and means adapted to energize said charge for causing a stream of vapor flow therefrom,
and a monitor for measuring the intensity of such stream comprising,
a pair of electrodes, said electrodes comprising a pair of closely spaced parallel filament segments mounted in said stream,
joule heating means for energizing said filament segments differentially to cause a net thermionic emission of electrons from one of said electrodes to the other,
and circuit means including current responsive means connecting said electrodes one to the other.

5. The combination of claim 4, further including,
bias means connected to said source for maintaining said source positive with respect to said apparatus.

6. An evaporator for use in vacuum deposition apparatus comprising,
a plurality of evaporant sources each comprising a charge of evaporant material and means adapted to energize said charge for causing a separate stream of vapor flow therefrom,
and monitor apparatus for measuring the intensity of one of said streams comprising,
a pair of electrodes mounted in said one stream in close proximity to the corresponding evaporant source,
joule heating means for energizing said electrodes differentially to cause a net thermionic emission of electrons from one of said electrodes to the other, said net emission as modified by vapor between the electrodes constituting a thermally generated current between said electrodes,
and circuit means including current responsive means connecting said electrodes one to the other operative to sense changes in said current between said electrodes,
and bias means connected to source of said one stream for maintaining the same positive with respect to said apparatus.

References Cited by the Examiner

UNITED STATES PATENTS

| 2,119,675 | 6/1938 | Gustin | 313—310 X |
| 2,206,509 | 7/1940 | Lederer | 118—49.1 X |
| 2,391,595 | 12/1945 | Richards et al. | 118—49 X |
| 3,168,418 | 2/1965 | Payne | 118—49.1 X |
| 3,235,480 | 2/1966 | Swartz et al. | 118—49.1 X |

OTHER REFERENCES

Giedd et al.: IBM Technical Disclosure Bulletin, "Evaporation Rate Monitor," vol. 4, No. 9, pp. 13–14, February 1962.

ANTHONY BARTIS, *Primary Examiner.*

RICHARD M. WOOD, C. L. ALBRITTON,
*Assistant Examiners.*